July 7, 1970     R. G. DARROW ET AL     3,518,981

HEAT-CLEANING OVEN AND METHOD

Filed Dec. 23, 1966

INVENTORS
RICHARD G. DARROW
WILLIAM F. MORSE
EDWARD A. REID
CHARLES W. FROMM

BY
*Curtis, Morris & Safford*
ATTORNEYS

United States Patent Office 3,518,981
Patented July 7, 1970

3,518,981
HEAT-CLEANING OVEN AND METHOD
Richard G. Darrow, Columbus, William F. Morse, Upper Arlington, and Edward A. Reid, Jr., Columbus, Ohio, and Charles W. Fromm, Teaneck, N.J., assignors to Columbia Gas System Service Corporation, New York, N.Y., a corporation of Delaware
Filed Dec. 23, 1966, Ser. No. 604,352
Int. Cl. A21b *1/00;* F24c *15/32*
U.S. Cl. 126—21                                13 Claims

ABSTRACT OF THE DISCLOSURE

A household or commercial oven for cooking food and adapted to be self-cleaning, utilizing infrared heat to perform the cooking and the cleaning operations. The heating is performed by gas burners of the self radiant type, and air circulation is limited so that most of the gases which pass through the oven enter through the burners.

---

This application is related to application Ser. No. 422,362, filed Dec. 30, 1964, and now Pat. No. 3,459,170. In that co-pending application there is disclosed an oven and a method of operation by which infrared heat is used to various extents in cooking foods and also in removing soil which accumulates upon the exposed surfaces within the oven. The present invention relates to certain modifications and improvements with respect to such ovens and in the operation thereof.

An object of this invention is to provide a thoroughly satisfactory oven construction and method of operation for household and commercial ovens of the general type disclosed in the above-identified co-pending application. A further object is to provide simplified structures and modes of operations for ovens which are adapted to cook foods and which will also automatically remove soil accumulated upon the oven surfaces. A further object is to provide improved ovens of the self-cleaning type, and particularly such ovens which are gas heated. A further object is to provide for the above with ovens which overcome the various difficulties which have been encountered with similar constructions in the past, and with the operation being efficient, dependable and versatile. These and other objects will be in part obvious and in part pointed out below.

In accordance with the present invention, infrared heaters are provided which radiate infrared heat directly onto the soiled surfaces, and particularly directly onto the soil. The soil adhering to the oven surfaces is degraded and converted into ash dust, which may be wiped away, and gaseous products which pass away. Some large bodies of soil may remain, but they are not adhered to the oven surfaces and may be wiped away with the ash. The oven and the infrared heaters are so constructed and arranged that the exposed surfaces are thoroughly cleaned without an objectionable elevation in the temperature of the oven.

Figure 1:
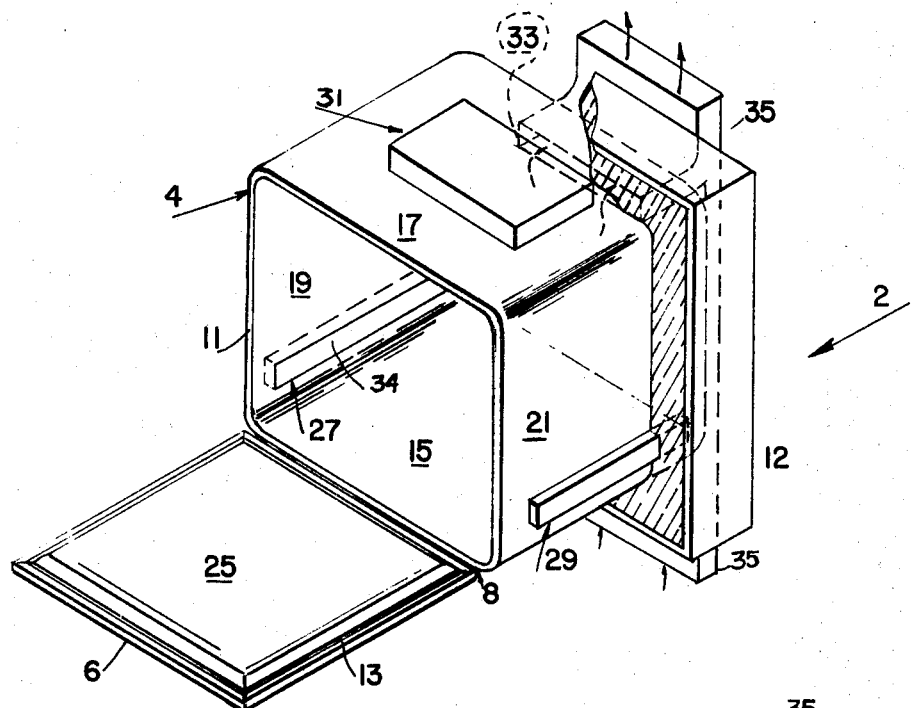
Figure 2:
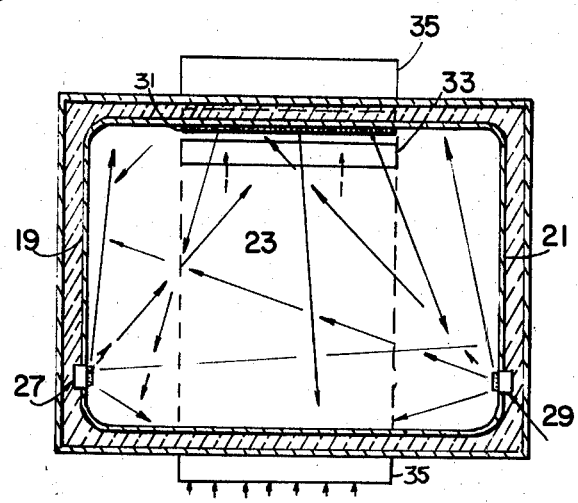
Figure 3:
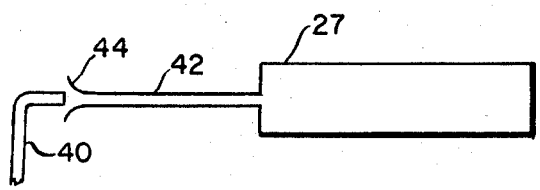

In the drawings:
FIG. 1 is a somewhat schematic perspective view of one embodiment of the invention, with parts broken away;
FIG. 2 is a vertical section which is also somewhat schematic, and which illustrates the operation of the embodiment of FIG. 1; and
FIG. 3 is a schematic representation of the gas-air supply system of a typical burner.

Referring to FIG. 1 of the drawings, a domestic or household oven 2 has an inner liner or shell 4 which has an open front and defines the oven cavity. Except as specifically set forth, the construction and operation of oven 2 are in accordance with the usual standards in the field. Hence, the normal baking, roasting and broiling operations are performed in the standard manner. The exposed surfaces of the oven cavity are stain-resistant enamel which is highly reflective. The front wall of the oven is formed by a double wall door 6 hinged at the bottom at 8 and having a handle (not shown). Mounted around the periphery of door 6 in alignment with the front edge 11 of liner 4 is an insulating door gasket in the form of strips of Fiberglas tape 13 which are pressed against edge 11 when the door is closed, so as to provide a restriction to the flow of air into the oven cavity. The entire liner 4 is surrounded by a layer of heat insulation 12, and door 6 includes insulation which is not shown. For purposes of reference, the walls of the oven cavity are: bottom wall 15; top wall 17; and, the side walls which are side walls 19 and 21 (see also FIG. 2), rear wall 23 and front wall 25 which is the liner wall of door 6.

Mounted respectively near the bottom of side walls 19 and 21 are two horizontally elongated burner units 27 and 29, and mounted centrally in top wall 17 is a burner unit 31. In this embodiment, each of these burner units is of the wire mesh type, with a plenum chamber having an open port and (see burner unit 27) an infrared radiant burner element of wire mesh mounted in alignment with the wall of the oven liner, in the open port. The face of the burner element of the burner unit is parallel to its liner wall, and the burner element projects a short distance into the oven cavity. Hence, each of the burner units 27 and 29 has a burner element extending horizontally near the bottom wall 15 from near the front to near the rear of the oven. Burner unit 31 is rectangular and is centrally positioned in the top wall.

The burner units are of the atmospheric type, and during maximum oven heating operations, each of them is supplied with gas and air in the proper mixture to cause the entire exposed surface of its burner element to be heated to an infrared radiating temperature. The nature of the wire mesh burner elements is such that they produce somewhat controlled random infrared radiation throughout their exposed surfaces. Hence, as illustrated in FIG. 2, the side burner units 27 and 29 produce substantial infrared radiation to the top, bottom and side walls, including the front and rear walls. Each of burner units 27 and 29 produces intense infrared radiation to the adjacent corners and edges of the respective oven walls, including the door, and also produces some radiation to its own side wall. Similarly, the top burner unit 31 produces infrared radiation to all of the oven walls, including the door, and some to the top wall.

Positioned near the top of rear wall 23 (FIG. 2) is a horizontally elongated outlet opening 33 to a flue connection extending through the insulation to a flue 35. Flue 35 extends along the rear of the oven and has an open lower end which is adapted to receive fresh air, and it extends upwardly to an exhaust outlet or stack. As the products of combustion pass to outlet 33, those from each of the burner units 27 and 29 flow upwardly along the side walls, and those from burner unit 31 flow generally horizontally along the top wall. Hence, the products of combustion assist the infrared radiation in maintaining uniform heating conditions within the oven.

Oven 2 is used to cook foods by infrared radiation or by convection heating in accordance with standard practices, and with the usual control arrangements. The burner units may be operated to produce "blue flame heating," that is, at temperatures below those at which there is substantially infrared radiation. Burner units 27 and 29 are controlled separately from burner unit 31 so that burner unit 31 may be operated alone, or the other burner units may be operated with or without burner unit 31.

The oven-cleaning operation is started by closing the oven door and turning on all of the burner units for maximum infrared heating. The maximum infrared heating is continued until the temperature within the oven cavity reaches a predetermined maximum. The burner units are then controlled to maintain that maximum temperature for a period of time which is sufficient to clean the soil from the exposed oven surfaces. In this embodiment, the temperature is controlled by a control unit (not shown) which has a heat sensing element positioned in the outlet opening 33 in the path of the air passing from the oven cavity through the flue connection. The temperature of that air is substantially the same as that of the maximum temperature in the oven cavity. Automatic timer means is provided which turns off all of the burner units at the end of a predetermined period of time after the start of the heat-cleaning operation. That period of time is the minimum for the particular installation which will insure the proper cleaning of the oven surfaces. Hence, in this illustrative embodiment the predetermined period of time is an overall period which constitutes the warm-up period and a hold period. During the warm-up period the oven is heated continuously by the maximum infrared heating, and during the hold period the oven is heated intermittently with the burners being turned off and on by the controls so as to maintain the uniform maximum temperature referred to above.

The invention contemplates that other control arrangements may be provided which retain the advantages of the invention, and some of which give other features of control over the operations. For example, the heat-up and hold periods may be separately time-controlled, and a safety thermostat may be provided to cut off the heater units if a predetermined excessive temperature is reached. Also, burner 31 may be used alone during the hold period, i.e., burners 27 and 29 are turned off complete at the end of the heat-up period. With the illustrative embodiment, the arrangement may be such that the oven remains closed for an additional period of time after the termination of the hold period of the heat-cleaning operation. However, the construction and the temperature conditions are such that no harm results from opening the oven door immediately after the hold period of the heat cleaning operation has been completed.

The heated gases within the oven cavity and the flue 35 produce a substantial stack effect tending to cause the gases to be drawn up the flue. That causes a substantial flow of fresh air into the bottom of the flue, which mixes with the hot gases emerging from the oven. That mixing of the fresh air dilutes the hot gases so as to reduce the temperature to an acceptable level even during the heat-cleaning operation.

The stack effect referred to above also causes leakage of air in through the door gasket, and it also draws air in through the burner units when they are turned off during the hold period. Both burners 27 and 29 are of the atmospheric or self-aspirating type wherein gas is supplied from a gas supply line 40 to a gas-air supply line 42 leading to the burner itself. As seen in FIG. 3 wherein only burner 27 is illustrated, it being understood that the construction of burner 29 is the same, the entrance end of gas-air supply line 42 includes a venturi shaped nozzle segment 44. Thus, during normal burner operation, when gas is supplied through supply line 40, the gas exits line 40 as a jet into the venturi nozzle and draws air into the nozzle in a proper amount to support combustion. However, even if no gas is supplied through supply line 40, for example when the burner units are turned off during the hold period, the air would continue to enter the venturi nozzle inlet 44 and flow into the oven cavity through the open burner ports of the burners. The air which enters by these paths constitutes a supply of oxygen, particularly during the hold period when the temperature is maximum. However, that entering air is preheated somewhat, and around the door there is not sufficient fresh air flow at any zone to detectably interfere with the heat-cleaning operation. For many cooking operations the major portion of the soil is at the bottom of the oven cavity, and when the side burner 27 and 29 are turned off during the hold period they supply fresh air directly to the bottom of the oven cavity where oxygen is most needed. Also, it should be noted that this arrangement permits the oven to be heated to the maximum temperature in a minmum period of time because of the reduced rate of entry of fresh air. Illustratively, the burner units are operated with an excess supply of oxygen, for example, at an air-gas ratio of 12 to 1. Hence, the hot gases from the burners include oxygen which is available to assist in maintaining a satisfactory supply of oxygen to the oven cavity.

The feature of substantially sealing the front of the oven cavity around the periphery of the door has proved to be quite advantageous. In the past it has been considered that it was necessary to supply fresh air to the oven cavity during the heat-cleaning operation in order to provide oxygen for degrading the soil. However, the soil in the vicinity of the point of entry of a large stream of fresh air is cooled by the entering air, and it has been difficult to elevate the temperature of that soil sufficiently to degrade it.

The oven-cleaning operation of the present invention converts layers of soil adhering to the oven surfaces completely into thin films of ash dust on the surfaces or in situ, and gases which pass from the oven through the outlet opening 33. The infrared radiation heating appears to be superior to conduction (and convection) heating in degrading soil. With the arrangement shown, there is complete degrading of particles in the gases, including particles in the vicinity of the outlet opening. Tests have shown that the oven surfaces are thoroughly cleaned of all soil adhering to them, even when the soil includes bodies or portions of the order of ¼" or more in thickness. Normally such thick portions are adhered to the bottom oven surface. In any case involving such portions of soil, the oven-cleaning operation produces a layer of ash along the oven wall, and a loose body or loose bodies of carbonized soil lying upon the ash and easily wiped away along with the ash. Hence, all of the oven surfaces are cleaned completely. The oven-cleaning operation is efficient and thorough, and it is completed in a period of time substantially less than when fresh air is permitted to enter freely into the oven cavity.

In the illustrative embodiment of the present invention using a household type of oven, very satisfactory results have been obtained with a maximum gas temperature of 1050° F. to 1100° F. at outlet opening 33 and with an overall oven-heating period of thirty minutes. The oven liner or wall temperature was of the order of 1000° F. In those tests the door was closed, and during the heat up period all three of the burner units were operated with maximum infrared radiation. The top burner unit 31 had a maximum heat output of 18,000 B.t.u. per hour, and each of burners 27 and 29 had a maximum heat output of 8000 B.t.u. per hour. The above mentioned temperature of 1050° F. to 1100° F. was reached in an initial heating-up period of the order of 20 to 25 minutes, and the heating control then maintained that temperature of 1050° F. to 1100° F. for an additional hold period which was the remainder of the total period of thirty minutes. The oven was then permitted to cool. During the hold period, the heat control did not modulate the heat, but turned all of the burner units off and on.

During the normal use of an oven such as that of the present invention, all of the volatile soil components are degraded during the heat-up period, that is before the oven-wall temperature reaches 1000° F. Hence, during the time when these components may pass into the hot gases and flow toward the outlet opening 33, the top burner unit 31 is operating at its maximum infrared radiation temperature and it tends to degrade any volatile soil components passing toward the outlet opening 33. During this period the side burner units 27 and 29 cooperate to produce substantial infrared radiation onto the soil accumulation which is apt to be greater at the bottom of the oven cavity. As explained above, the side burners act to supply heated air with the normal oxygen content during the hold period. Thus, the particular arrangement of the illustrative embodiment produces special results, as well as the unique results of the broader aspects of the invention.

What is claimed is:

1. In the art of cleaning the exposed surfaces within an oven cavity of the type which is used for cooking foods and wherein said exposed surfaces tend to become soiled by foods and residue, the steps of, substantially closing said oven cavity while permitting restricted air flow along paths in which the air is subjected to preheating, subjecting said exposed surfaces predominately to the action of infrared radiation and raising the ambient temperature within the oven cavity for a period of time until a predetermined temperature range is reached at which the soil will be degraded into films of ash dust in situ.

2. In an oven which is used for cooking food and which has exposed surfaces which tend to become soiled by food and residue, an oven shell and door construction providing a substantially closed oven cavity, vent means to permit hot gases to flow from the upper portion of said oven cavity with the aid of a stack effect, infrared burner means positioned in said shell adapted to subject the exposed surfaces within the oven cavity predominately to infrared radiation, means permitting restricted air flow to said cavity along paths in which the air is subjected to preheating, and control means to operate said burner means through a heat-cleaning operation to raise the temperature of the soil within said oven cavity to a temperature range wherein the soil is degraded into films of ash dust in situ.

3. In an oven which is used for cooking food and which has exposed surfaces which tend to become soiled by food and residue, an oven shell and door construction providing a substantially closed oven cavity, infrared burner means positioned in said shell adapted to subject the exposed surfaces within the oven cavity to infrared radiation during a cleaning cycle, and auxiliary burner means selectively operable during a portion of said cleaning cycle to assist said first-mentioned burner means in elevating the temperature of the soil in said oven cavity to a temperature range wherein the soil accumulated on said surfaces is degraded, said auxiliary burner means being adapted to operate intermittently so as to maintain a desired temperature condition within said temperature range.

4. Apparatus as described in claim 3 wherein said infrared burner is positioned at the top portion of said oven cavity and said auxiliary burner means is positioned near the bottom wall of said oven cavity.

5. The method as described in claim 1 including the steps of maintaining said predetermined temperature range within the oven cavity for an additional period of time, and increasing the rate of supply of fresh air to the oven cavity during said additional period of time.

6. The method as described in claim 1 wherein the infrared radiation is produced in two zones positioned at the sides of said oven cavity adjacent the bottom thereof and in a third zone positioned at the top of said oven cavity.

7. The method as described in claim 6 wherein said infrared radiation is produced by gas-fired burner units, and which includes the steps of, discharging hot gases from burner units into said oven cavity and from the top of the said oven cavity.

8. Apparatus as described in claim 2 wherein the structure is so constructed and arranged as to provide restricted flow of fresh air into said oven cavity with a substantial increase in the flow when the oven cavity temperature reaches said temperature range.

9. Apparatus as described in claim 2 wherein said burner means comprises at least two gas fired burner units at least one of which is positioned near the bottom of said oven cavity and the other of which is positioned in the top of said oven cavity.

10. Apparatus as described in claim 2 wherein said vent comprises a gas outlet opening and a stack connected thereto.

11. Apparatus as described in claim 9 wherein said stack includes means to mix fresh air with the hot gases flowing from said oven cavity to thereby reduce the temperature of the gases flowing from said stack.

12. Apparatus as described in claim 2 wherein said door has a gasket of fiberglas or the like through which air may leak into said oven cavity.

13. Apparatus as described in claim 2 wherein said burner means comprises a plurality of atmospheric type gas-fired burner units at least one of which may be shut off to permit the entry of air therethrough into said oven cavity.

References Cited
UNITED STATES PATENTS

| | | | |
|---|---|---|---|
| 3,155,814 | 11/1964 | Appleman et al. | 126—273 X |
| 3,348,023 | 10/1967 | Lewis et al. | 126—21 X |
| 3,364,912 | 1/1968 | Dills et al. | 126—21 |
| 3,416,507 | 12/1968 | Huebler et al. | 126—21 |

EDWARD G. FAVORS, Primary Examiner

U.S. Cl. X.R.

126—273